United States Patent [19]

Clark

[11] Patent Number: 4,491,841
[45] Date of Patent: Jan. 1, 1985

[54] SELF-ADJUSTING INDUCTIVE OBJECT-PRESENCE DETECTOR

[75] Inventor: Michael A. G. Clark, Hampshire, England

[73] Assignee: Sarasota Automation Limited, Winchester, England

[21] Appl. No.: 532,087

[22] Filed: Sep. 14, 1983

Related U.S. Application Data

[63] Continuation of Ser. No. 250,783, Apr. 3, 1981, abandoned.

[51] Int. Cl.³ .............................................. G08G 1/00
[52] U.S. Cl. .................................... 340/939; 246/249; 340/551; 340/941
[58] Field of Search .................. 340/38 L, 38 R, 551, 340/568, 939, 941; 246/249

[56] References Cited

U.S. PATENT DOCUMENTS 4,296,401 10/1981 Duley ................................ 340/38 L

FOREIGN PATENT DOCUMENTS

1338062 11/1973 United Kingdom .
1366875 9/1974 United Kingdom .
1398937 6/1975 United Kingdom .
1495759 12/1977 United Kingdom .

Primary Examiner—Glen R. Swann, III
Attorney, Agent, or Firm—Sughrue, Mion, Zinn, Macpeak and Seas

[57] ABSTRACT

A vehicle detector has an inductive sensing loop that is a frequency determining element of an oscillator. A first counter is operated to sample the oscillator frequency or period and the count achieved is applied as a preset reference to a second down counter which is counted down in one sample period while a fresh count value is being established in the first counter. The residue in the second counter at the end of a sample period is examined by detection logic to determine the presence of a vehicle. Preferably the first counter is updated every Nth sample period whereas the second counter is activated every sample period. Upon vehicle detection the first counter is frozen at the value preceding detection, the second counter continuing operation. During vehicle detection third and fourth counters are operated in the manner of the first and second counters respectively before detection, detection logic examining the residues in the fourth, down, counter to generate control signals for incrementally adding or subtracting from the count values in the first and third counters so as to reflect ambient changes during vehicle presence. In order to detect the departure of the vehicle, the second counter is consequently preset with the predetect value of the first counter as adjusted for ambient change.

20 Claims, 3 Drawing Figures

SELF-ADJUSTING INDUCTIVE OBJECT-PRESENCE DETECTOR

CROSS-REFERENCE TO A RELATED APPLICATION

This application is a continuation of application Ser. No. 250,783, filed Apr. 3, 1981, now abandoned.

FIELD OF THE INVENTION

This invention relates to a method and apparatus for the detection of an object and particularly the arrival of the object at a particular location where a sensing element is located that is sensitive to the presence of the object in the vicinity of the element. In some cases the detection requires the detection of departure of the object from the location, i.e. the period of presence of the object is required.

Both the detection of the arrival and departure of the object is made more difficult where the sensing element is subject to significant ambient change that affects the parameter of, or associated with, the sensing element that is monitored by presence detector apparatus connected with the element in an object sensing installation. The present invention finds particular application in vehicle detection where the sensing element is commonly located in an outside environment subject to varying weather conditions.

BACKGROUND TO THE INVENTION

Vehicles are commonly detected by their influence on the inductance of an a.c. energised detector loop laid in the roadway or other place where detection is required. In some circumstances it is necessary to continue to signal the arrival of a vehicle at the detector loop, assuming the vehicle remains stationary, for at least a selected period of time—the presence time. It may also be desired in some cases to have a "permanent" or indefinite presence time so that the presence indication is only cancelled upon the departure of the vehicle from the detector loop.

Vehicle detection is commonly done by making the detector loop the frequency determining element of an oscillator, and monitoring frequency (or oscillator period) changes to determine whether a vehicle is present in the vicinity of the loop. In performing such monitoring due allowance needs to be made for ambient changes affecting the oscillator frequency, which changes may be referred to as environmental drift.

The frequency changes may be monitored by regularly sampling the oscillator frequency and examining successive samples for a change that is taken to indicate the arrival of a vehicle. Environmental drift is allowed for on the general basis that changes due to it are at a slow rate relative to the rate of change due to the arrival of a vehicle. However, once the vehicle arrives it is conventional practice to hold as a reference a sample value obtained prior to arrival. Further samples are now compared with the reference to determine whether the vehicle has left the loop vicinity, this procedure occurring over the presence period after which the apparatus is restored to its normal sampling and examination routine.

Sampling may be performed by various digital techniques such as described in British Pat. Nos. 1,495,759, 1,448,967, 1,366,875. Analog techniques were previously known, for example, as disclosed in British Pat. No. 1,338,062. One concern of the present invention is with the provision of a sampling method and apparatus, particularly for use in the detection of the arrival of a vehicle.

During the presence period following vehicle detection, if the reference sample is not compensated for environmental drift and such drift occurs in the "detect" direction, i.e. influences the oscillator frequency in the same sense as the vehicle arrival, it may be that the sample obtained on vehicle departure is still indicating, falsely, a vehicle presence. On the other hand if the drift occurs in the "non-detect" direction, it may be that over an extended presence period the samples eventually obtained are taken as indicating, falsely, the departure of the vehicle.

Two previous solutions to these difficulties have been to either keep the presence time short, e.g. a few minutes, before restoring the detector loop to normal operation, or increment the reference value steadily in the detect direction in which case eventually the conditions required for a presence signal no longer apply. The first approach sets out to forget the vehicle presence after a short period; the second has the same result. A better solution based on digital sampling is described in British Pat. No. 1,398,937.

It will be shown hereinafter how the present invention may be put into practice to achieve "permanent" presence time while at the same time allowing for environmental drift during the presence period. As already mentioned, the invention is also concerned with detection procedures for the arrival of a vehicle and provides a method and apparatus to that end that is conveniently and compatibly used with the procedures applied during the presence period.

SUMMARY OF THE INVENTION

Accordingly, a first aspect of the invention provides a method of detecting the arrival of an object, e.g. a vehicle, in the vicinity of a sensing element, e.g. a detector loop, sensitive to such object and subject to ambient change. This method comprises: sampling the state of the element at successive occasions to obtain sample values dependent on the state of the element; establishing at a first rate a first succession of sample values each being superseded by the next as a reference value; establishing at a second rate greater than the first rate a second succession of sample values and comparing each of these sample values with the existing reference value; and indicating the presence of an object in the vicinity of the loop upon the difference between the existing reference value and a sample value of the second succession compared therewith exceeding a selected threshold.

The invention further provides presence detector apparatus for use in an installation in which the presence of an object is detected by monitoring the state of a parameter of, or associated with, a sensing element sensitive to the presence of an object in the vicinity thereof. The apparatus includes a detection circuit that comprises: first means for storing a reference value representing the state of the sensing element; second means for storing a sample value representing the subsequent state of the element; means responsive to the difference between the sample and reference values exceeding a threshold value to provide a signal indicative of the arrival of an object in the vicinity of the sensing element; and means for controlling the establishing of a succession of reference values in the first means and a succession of sample values in the second means such that the succession of sample values in the second means is established at a rate greater than the succession of reference values in the first means.

The method and apparatus recited above are primarily concerned with the detection of the arrival of an object to the vicinity of the sensing element.

In connection with the compensation of ambient change during the presence of an object in the vicinity of a sensing element, the invention provides in a third aspect a method of detecting an object with the aid of a sensing element sensitive to the presence of such an object in the vicinity of the element and subject to ambient change. This method comprises sampling the state of the element at successive occasions to obtain sample values dependent on the state of the element; comparing selected sample values to detect and indicate the arrival of an object in the vicinity of the sensing element; storing a sample value reflecting the state of the sensing element preceding detection upon the detection of an object being indicated as a first reference value; comparing a sample value obtained after detection with the first reference value to detect and indicate the departure of the object from the vicinity of the sensing element; and compensating for ambient change in at least one sense during the detected presence of an object by storing a sample value reflecting the state of the sensing element following the detection of an object being indicated as a second reference value; comparing sample values obtained after detection with the second reference value to detect changes due to ambient change to be compensated; and adjusting the first reference value in accordance with these detected changes.

In yet another aspect of the invention there is provided presence detector apparatus for use in an installation in which the presence of an object is detected by monitoring the state of a parameter of, or associated with, a sensing element sensitive to the presence of an object in the vicinity thereof. The apparatus includes a first detection circuit responsive to a succession of sample values representing the state of the sensing element to detect and signal a change therein indicative of the arrival of an object in the vicinity of the sensing element, said first detection circuit including first means for storing a first reference value representing the state of the sensing element preceding such detection, and second means responsive to the stored reference value and to sample values following detection to detect and indicate the departure of the object from the vicinity of the sensing element; and a second detection circuit for compensating ambient change in at least one sense during the detected presence of an object. This second detection circuit comprises third means for storing a second reference value representing the state of the sensing element following detection; fourth means for establishing a succession of sample values representing the state of the sensing element after detection; and fifth means responsive to a difference between the second reference value and the sample value established by the fourth means having a selected magnitude as indicative of ambient change in these sample values. The fifth means is coupled to said first means to adjust the first reference value by a predetermined amount in dependence upon ambient change detected by said fifth means, and is coupled to the third means to adjust the second reference value by the same predetermined amount so as to maintain a minimal difference between the second reference value and the sample values established by the fourth means.

In the preferred practice of the invention applied to vehicle detection as described hereinafter, the arrival detection aspects of the invention are combined with the aspects relating to ambient compension during the presence of the vehicle.

It is contemplated that in vehicle detection it may be required in some circumstances to compensate ambient change in the "detect" direction only. In the installation now to be described in detail ambient change in both senses is compensated.

BRIEF DESCRIPTION OF THE DRAWINGS

The invention and its practice as applied to a vehicle detection installation embodying same, will now be further described with reference to the accompanying drawings in which:

FIGS. 2 and 3 are somewhat simplified on the time axis for ease and clarity of illustration. The nature of this simplification is discussed later. It does not affect a proper understanding of the operation of the embodiment illustrated in FIG. 1.

DESCRIPTION OF THE PREFERRED EMBODIMENT

Figure 1:
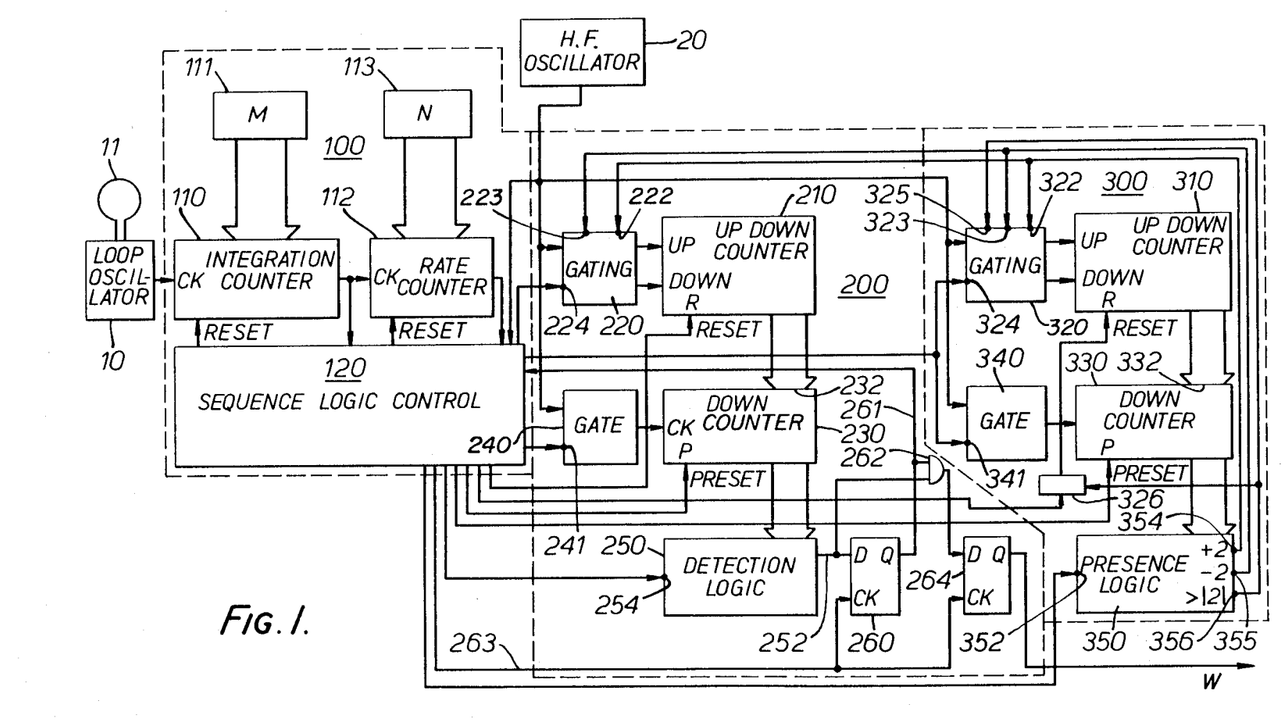
FIG. 1 shows a block circuit diagram of the installation.

An embodiment of the invention is illustrated in FIG. 1 which shows a presence detector apparatus adapted to receive a signal directly from a loop oscillator installation. In most loop oscillators the oscillation frequency increases in the presence of a vehicle and this sense of frequency change will be assumed in describing the operation of the illustrated apparatus. There are additionally two methods of obtaining successive samples of the oscillator frequency. One is to count the cycles of the loop oscillator over a predetermined period, by a preselected number of cycles of a separate clock source; this is a direct measure of frequency that gives an increased sample count value for an increase in oscillator frequency: the other is to count the cycles of a separate clock source over a period defined by a selected number of cycles of the loop oscillator; this is a measure of the loop oscillator period, over the selected number of cycles, that gives a decreased sample count value for an increased loop oscillator frequency. The latter sampling method is adopted in the apparatus to be described.

The apparatus of FIG. 1 is shown connected to a detector loop oscillator 10 which may be of any kind and from which is obtained a square-waveform signal whose frequency increases in the presence of a vehicle in the vicinity of the detector loop 11. The apparatus includes an input circuit 100 for generating sampling periods as well as control signals for the whole apparatus, a presence detection circuit 200 that both detects the arrival of a vehicle in accordance with prescribed detection criteria and that tracks ambient change when a vehicle is not present; and a circuit 300 that enables tracking of ambient change to continue in the presence of a vehicle. Circuit 300 may be conveniently referred to as a presence tracking circuit. Both circuits 200 and 300 generate a succession of sample values and compare these in a particular manner to be described with the aid of the sample periods generated by input circuit 100 and a separate stable clock source 20 derived for example from a crystal-controlled oscillator whose frequency is assumed to be at least several times, and typically some tens of times, that of the loop oscillator.

The input circuit 100 comprises serially-connected counters 110 and 112. The clock input of counter 110 receives the frequency output signal of the loop oscillator installation 10 and divides it by a factor M selected by, for example, manually-settable switches 111 or by a remote programming source. The output of the counter 110 is connected as the clock input of counter 112 that performs a further division by a factor N selected by, for example, manually-settable switches 113 or by a remote programming source. The outputs of both counters are applied to a sequence control logic unit 120 which supplies reset signals to both counters at the start of operation. Each counter operate cyclically so that the counter 110 delivers an output pulse at every Mth cycle of the loop oscillator while counter 112 delivers an output pulse very M.Nth cycle. These pulses are used by unit 120 to control gates in circuits 200 and 300. The unit generally controls the functioning of these circuits as will become apparent from the following description.

The unit 200 comprises an UP/DOWN counter 210 exemplified as having separate up and down clock inputs to which clock pulses from source 20 are steered by a gating unit 220. The gating unit 220 has logic inputs 222 and 223 under the control of circuit 300. These control inputs will be described further hereinafter. The gating unit 220 has a further control input 224 connected to the sequence control logic unit 120. Activation of this control input causes clock signals to be gated to the up-input of counter 210. The counter also has a reset input R connected to the sequence control logic unit 120.

By re-setting the counter 210 and gating clock pulses to it for a sample period, the counter achieves a count value that is a measure of the current period of the loop oscillator. This procedure is repeated at intervals to up-date the sample value in the counter 210.

The circuit 200 also includes a DOWN counter 230 whose load input 232 is connected to the stages of counter 210 so that a count value achieved in counter 210 is loaded into the down counter 230 upon application to its preset input (P) of a control signal from unit 120. The clock input (CK) of the counter 230 is connected to clock source 20 through a gate 240, e.g. an AND-GATE, having a control input 241 connected to unit 120 whereby the sample periods for which clock pulses are gated to the DOWN counter are controlled. The sample period is the same as that for the counter 210 but as will be shown with reference to FIG. 2, the sample rate is N times as great.

The output of the DOWN counter 230, or at least the relevant bits thereof, is connected to a detection logic unit 250 that is operable to provide a DETECT signal on line 252 when a residual value in the DOWN counter exceeds a given threshold. The moment at which this decision is made by detection logic unit 250 is controlled by a signal from the unit 120 applied to control input 254. As will become clear from the following description, the residual value referred to is the value remaining in counter 230 following the loading into the counter of a value from counter 210 and the decrementing of the loaded value by clock pulses from the source 20 over a sample period.

The DETECT signal (assumed to be at logic level 1) from unit 250 is applied to the D-input of a first detect latch 260 (a D-type latch) whose Q output signals the DETECT condition (as level 1) back to unit 120 on line 261 and enables a two-input AND-gate 262 whose second input goes to the output 252 of the detection logic unit. The AND-gate output is in turn applied to the D-input of a second detect latch 264 (a D-type latch) from whose Q output a vehicle presence-indicative signal W (level 1 or high) is obtained. The latches 260 and 262 have their clock inputs connected in parallel to the unit 120 over line 263 and are clocked after each operation of the detection logic unit 250 to examine the state of its output. A presence-indicative signal is given only if two successive operations of the unit 250 yield a DETECT output. The first such operation sets latch 260 (Q goes high) when the clock pulse is applied thereto. The second latch 264 can only be set via AND-gate 262 to provide signal W on the next clock pulse thereto if the next operation of unit 250 also yields DETECT. If not, the Q output of latch 260 goes to logic 0 again on this clock pulse to inhibit gate 262. Once the Q output of latch 264 goes high it remains high for as long as the detection logic unit continues to provide the DETECT output. When the latter goes low again, the latch is reset on the next clock pulse thereto.

Before going on to describe presence tracking circuit 300, which has much in common with circuit 200, the operation of circuit 200 will be further explained with reference to the timing diagrams and waveforms of FIG. 2. The operation to be described is that preceding and including a vehicle detection.

Figure 2:
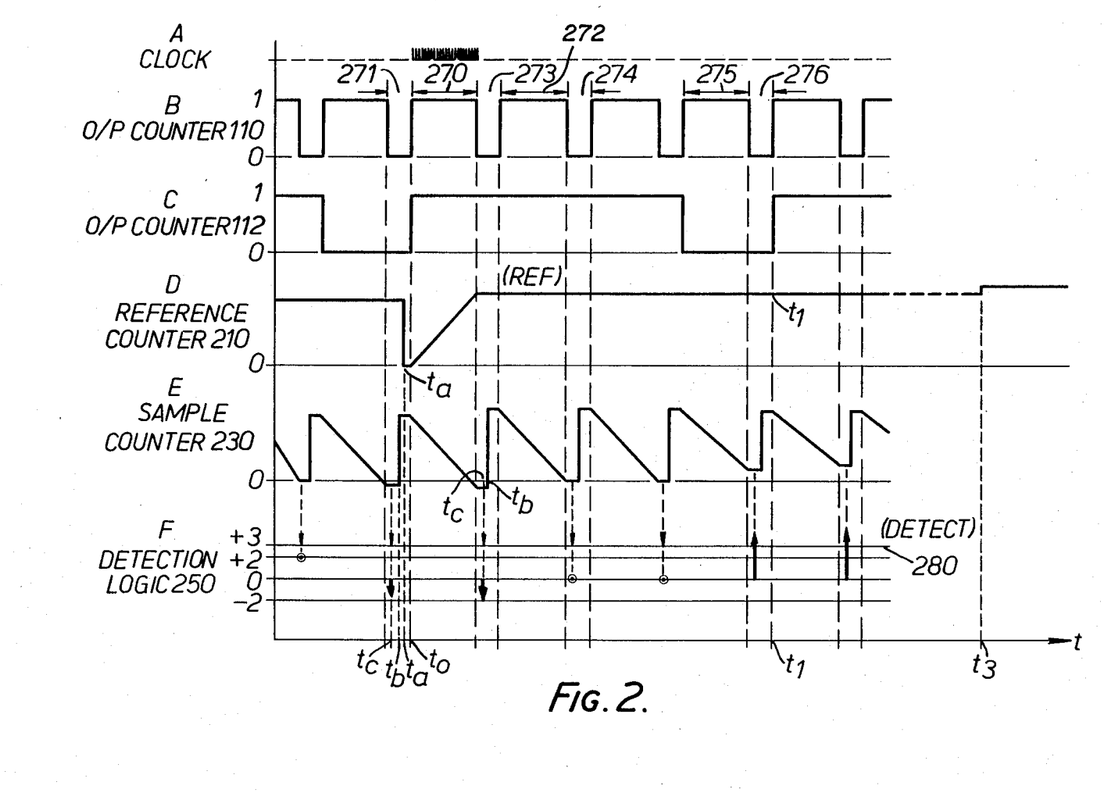
FIG. 2 shows a number of time diagrams (A to F) illustrating the operation of a presence detection circuit 200 of FIG. 1.

In FIG. 2 waveform A shows a portion of the high frequency clock pulse train from source 20. The loop oscillator output is not shown directly but the output of the counter 110 is shown by waveform B for a division of the loop oscillator frequency by a factor M of 4. The counter output goes low on the last loop oscillator cycle in each sequence of four and is high for the first $M-1$ ($=3$) cycles. The outut of the counter 112 is shown at C where the output of counter 110 is divided by a factor N of 4. The output of counter 112 goes low on the last cycle in each sequence of four from the counter 110 and is high for the first $N-1$ ($=3$) cycles. These cycles of counters 110 and 112 define basic operating periods of the system. The cycle of counter 112 determines the sampling rate for counter 210 whose operation is illustrated by FIG. 2D; the cycle of counter 110 determines the sampling rate for counter 230 whose operation is illlustrated by FIG. 2E. The counter 110 also determines the operation of the detecton logic unit 250 whose action on residual values is illustrated by FIG. 2F. The sample periods for both counters 210 and 230 are determined by the high level output periods of loop oscillator counter 110. Thus a sample period is $M-1$ loop oscillator cycles and thus is proportional to the loop oscillator period; the remaining loop oscillator cycles in each sequence of M provides for data processing functions to determine the presence of a vehicle. Each low level interval in the output of counter 110 may be called the processing interval.

Considering operation of circuit 200 in more detail, when the outputs of both counters 110 and 112 revert to high such as at time $t_o$ occurring every $M \times N$ loop oscillator cycles, the unit 120 applies a signal to input 224 of gating unit 220 for the duration of the immediately following high level output from counter 110-interval 270. The counter 210 was reset by unit 120 at a time $t_a$ in the immediately preceding processing interval 271. The clock pulses of FIG. 2A are clocked into the counter 210 the value recorded in which increases to reach a count value at the end of interval 270 that is a measure of the current loop oscillator period. This value which is used as a reference value is held for the remainder of the cycle of counter 112 at which time the value is updated, unless a vehicle detection has occurred meanwhile. Thus the reference value (REF) at the end of interval 270 replaces that of the preceding cycle of counter 112, the end portion of which is seen at the left of FIG. 2, and demonstrates the up-dating of the reference in the absence of vehicle detection.

The gate 240 controlling the clock input to DOWN-counter 230 has the high level output of counter 110 applied to it via unit 120 so that the DOWN counter is activated for every such interval 270, 272 and so on to provide samples at a rate N times that of counter 210. In the processing interval preceding each sampling period, the DOWN-counter 230 is loaded with the reference value from the counter 210 by a signal applied to the preset input such as indicated at the time $t_b$ in processing interval 273; the counter value is then decremented by the clock pulses to leave a residue at the end of the sampling period 272. If the loop oscillator frequency remains constant, so does the sampling period, and the residual count value in counter 230 at the end of a sampling period will be nominally zero and in practice $0\pm1$ in order to allow for counter sampling error.

Thus the residual value in the DOWN-counter is a measure of the change in loop oscillator frequency since the last reference sampling period for counter 210. These residues are examined by detection logic unit 250 upon the application thereto in each processing interval of a signal on line 254 from unit 120 at a time $t_c$ that precedes the load signal at $t_b$. The examination performed by unit 250 is discussed further below.

It will be noted that the DOWN-counter is clocked in the sampling period 270 during which the counter 210 is achieving an up-dated value. In this case the resultant residue in the DOWN-counter is based on the previous reference value in counter 210. To this end the sequence control logic unit has to apply the preset signal at time $t_b$ in processing interval 271 to precede the reset to counter 210 at $t_a$, i.e. $t_c$, $t_b$, $t_a$ occur in that order.

From the foregoing it will be appreciated that the rate at which the counter 210 can track ambient-caused changes in the loop oscillator frequency is determined by the factor M×N controlling the up-dating cycle of the counter. The sampling rate for detection is the rate of residues and is thus determined by the factor M. This factor also determines the sensitivity of the system in that the residual value obtained for a given change in loop oscillator frequency increases with the sampling period proportional to (M−1) oscillator cycles. Divisions of the cycle of counter 110 into sampling and processing intervals other than M−1 and 1 could of course be chosen. Typically loop oscillator frequencies are some tens of kiloHertz; the clock source 20 may be at about 4 MHz. With these parameters the values for M and N would typically be 256 and 128 respectively. For clarity of description and illustration, the values have been selected much lower. It will also be appreciated that the signal sequences generated by the sequence control logic unit 120 can be timed with reference to the clock pulses from source 20.

The action of the detection logic is illustrated in FIG. 2F. When a vehicle arrives in the vicinity of loop oscillator installation 10, we have assumed the case where the loop oscillator frequency increases; thus the sample period to the DOWN-counter 230 decreases and the residual values therefore increase. As stated above a count error of ±1 has to be allowed in the residue. The unit 250 establishes a detection threshold for vehicle detection at say a residue in excess of ±2 indicated by line 280. If the residue examined at the time $t_c$ in a processing interval is 3 or more a DETECT signal (logic 1 or high) is given on output 252. The presence of a vehicle is normally expected to yield a residue much higher than +2. If the residual values are +2 or less, including negative values which may be realised in their binary complement form from counter 230, no DETECT output is given and the cycle of normal detection operation continues.

By way of example, FIGS. 2E and F illustrate how during the course of one cycle of the reference value from counter 210, the loop oscillator frequency has drifted lower (the non-detect direction), yielding a negative residue at processing interval 273. This is corrected by the up-dating of the reference value in sampling interval 272 to give a zero residue in processing interval 274. Similar action occurs if the drift is in the detect direction. The DETECT threshold 280 is chosen with regard to the other parameters of the system so that drift alone, which is at a slow rate, will not cause a false DETECT condition between successive up-datings of counter 210. To illustrate a vehicle detection, assume a vehicle arrives during the sampling period 275, to give a positive residue of +3 or more in the following processing interval 276. A DETECT output is given. Provided that a DETECT output is also given at the next following processing interval, the presence indicative signal is given by latch 264 (FIG. 1) in the manner already described.

The first DETECT output at interval 276 is signalled to the sequence control logic unit 120, which prevents the application of further reset signals to counter 210 and the activating of the gating unit input 224 for as long as the DETECT condition remains. This is illustrated in FIG. 2 where had no detection occurred the counter 210 would have been up-dated at time $t_1$. In the absence of measures yet to be described, the pre-detect reference value is held in the counter while the vehicle is present.

The DOWN-counter 230 continues operating as before providing a stream of samples of the status of the detector loop installation. If the vehicle leaves the detector loop installation, the residual value should drop to or below threshold (+2) again releasing the DETECT condition and the inhibit signal to unit 120 so that normal operation is restored including up-dating counter 210. The apparatus thus far described is satisfactory for detection but does not take into account ambient drift once detection has occurred.

It can be seen that with the reference value (FIG. 2D) held fixed, if FIG. 2 were to be extended in time the residual value giving the DETECT condition will reflect subsequent ambient change. If such change is in the non-detect sense to decrease the residual value, the latter may fall below the detect threshold 280 to release the DETECT condition even if the vehicle has not moved away. This is more likely if the original excess over the threshold was small. On the other hand, if the ambient change is in the detect sense it may be sufficient over a prolonged period to leave the residual value at or above threshold to retain the DETECT condition even when the vehicle has left, a condition known as latch-up.

These disadvantages are mitigated by the presence tracking circuit 300 which enables the reference value in counter 210 to track ambient change and effectively to maintain a value that it would have if up-dated without the vehicle present.

Looking at circuit 300 in FIG. 1 in certain respects it provides a duplication of the circuit 200 but with certain modifications that will be described.

The circuit 300 includes an UP/DOWN counter 310 having separate UP and DOWN inputs and a reset input R controlled by the sequence control logic unit 120. Clock pulses from source 20 are gated to the counter 310 by gating unit 320. The unit 320 has respective control inputs 322 and 323 connected in parallel with the control inputs 222 and 223 respectively of gating unit 220. The gating unit 320 also has an input 324 corresponding to input 224 of gating unit 220 and activatable by a signal applied by sequence control unit 120 for a sample period to gate clock pulses to the UP input of counter 310 to provide therein a reference value in the same manner as with counter 210. The gating unit 320 has an additional inhibit input 325 with which the unit is normally held non-responsive to signals on input 324 except in conditions of relatively rapid change at the detector loop installation 10. More is said on this below. The signal on input 325 is also applied to a gate 326 controlling the transmission of reset signals to counter 310. The reset signals from unit 120 are also inhibited except under the conditions just mentioned. The effect of this additional inhibit function is that up-dating of the reference value in counter 310 is prevented while the situation at the detector loop is static and is only allowed when there is a rapid change taken to be indicative of the arrival or departure of a vehicle. Nonetheless provision is made to correct the reference value in counter 310 for slow ambient drift and to correspondingly correct counter 210 during vehicle presence.

To this end, the paralleled inputs 222, 322 and 223, 323 are activatable to gate a preselected number of pulses into the UP and DOWN inputs respectively of the counters 210 and 310. In the case under discussion the number is selected as two for both counting directions. These increments of ±2 are used to track the counters 210 and 310 to follow ambient drift during vehicle presence when, as already described, the regular up-dating of counter 210 ceases.

The circuit 300 also includes a DOWN-counter 330 having a pre-settable input 332 connected to the stages of counter 310 to load the reference value in the latter into the DOWN-counter when the sequence control logic unit applies a signal to its preset input P. Like counter 230, the counter 330 has its clock input connected to the source 20 through a gate 340, e.g. an AND-gate, whose other input 341 is controlled by the unit 120. Unlike the gate 240 however, the gate input 341 is connected in parallel with input 324 of gating input 320. The consequence is that the counter 330 is activated once for each cycle of input counter 112 instead of once for each cycle of counter 110 which applies for DOWN-counter 230, i.e. at 1/Nth the rate of the latter. This lower rate is sufficient for the slow rate correction to be performed by circuit 300.

The output stages, or at least relevant ones of them, of DOWN-counter 330 are connected to a presence logic unit 350 which examines the residual value in the counter 330 after each load and count operation. The unit 350 is activated at the same rate that counter 330 is activated by control signals applied to input 352 by sequence control logic unit 120. The presence logic unit 350 has three outputs 354, 355 and 356. Output 354 is connected to the inputs 222, 322 of gating units 220 and 320 and activates these inputs only when a preselected positive residue is obtained from DOWN-counter 330. In the example given the selected residue is +2. Thus activation of positive residue output 354 causes two pulses to be clocked into the respective DOWN inputs of counter 210 and 310 to decrement the respective reference values so as to act to reduce the residue from DOWN-counter 330 to zero at the next activation of counter 330. It is seen that to this end the number of pulses clocked into counter 310 is equal to the residual value at which the output 354 is activated.

The output 355 of the presence logic unit 350 provides a similar but opposite sense of correction. It is activated only for a selected negative residue, in this case −2, to apply a signal to inputs 223 and 323 of gating units 220 and 320 to cause two pulses to be clocked into the respective UP inputs of counters 210 and 310 to increment the respective reference values so as again to act to reduce the residue from DOWN-counter 330 to zero at the next activation of counter 330. Again, the modulus of the negative residue at which output 355 is activated is equal to the number of corrective pulses clocked into the UP/DOWN counters.

By regularly activating DOWN-counter 330 in presence tracking circuit 300, drift during the presence of a vehicle is followed and the reference value in counter 310 corrected for it. At the same time the ambient corrections are simultaneously applied to the reference value held in the presence detection circuit 200 which it will be recalled is holding the reference value obtaining at the time of detection, that is the reference value pertaining to loop conditions before the vehicle arrived. The reference value held in counter 310 is different to that held in counter 210. The value in counter 310 pertains to the vehicle present condition and provides a standard against which to compare the samples taken by DOWN-counter 330 during vehicle presence. It is necessary, therefore, to establish this vehicle present reference value in counter 310 and this is effected with the aid of the output 356 of the presence logic unit. Output 356 is activated for a residual value of either polarity in excess of the drift threshold set for outputs 354, 355. In the present example, therefore, it is activated for residues >/2/, i.e. of numerical magnitude 3 or more. It represents a change in the loop oscillator frequency of sufficient magnitude and rate to indicate the departure or arrival of a vehicle.

The output 356 is normally at a level that inhibits the transmission to the counter 310 of both reset signals and sampling period signals from unit 120. When the output 356 is activated by a residue of /≧3/ these signals may be applied to the counter 310 to establish therein a fresh reference value representing the condition of the detector loop installation 10 just after the arrival or departure of a vehicle. How this and the tracking facility outlined above are done may be better understood by reference to FIG. 3. In considering this figure, the action of presence logic unit 350 may be summarized as follows: residue of 0 or ±1-no output; residue of ±2-output 354 or 355 respectively activated; and residue >/2/- output 356 activated.

Figure 3:
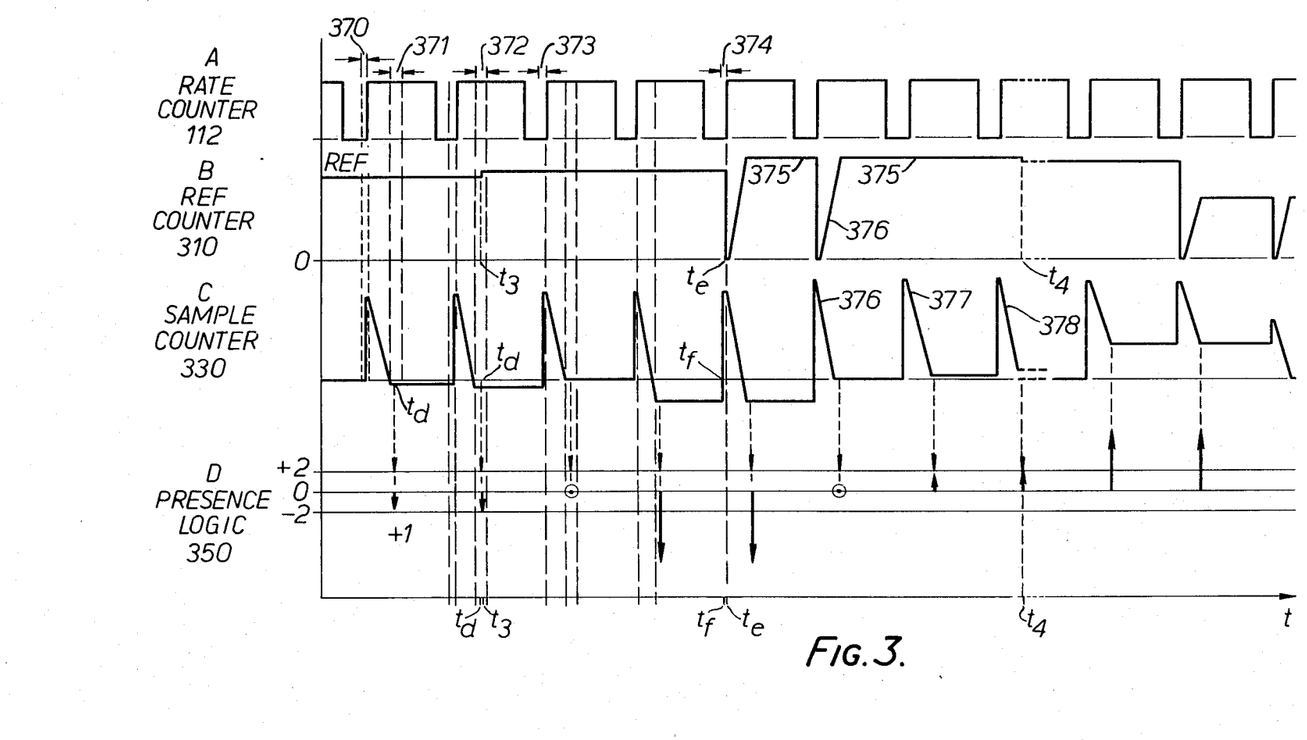
FIG. 3 shows a number of time diagrams (A to D) illustrating the operation of a presence tracking circuit 300 of FIG. 1.

Looking at FIG. 3, waveform A is the output of counter 112, which may be regarded as a rate counter, corresponding to FIG. 2C. On the time scale of FIG. 3, and assuming as before that M=4, the processing interval is defined as the last quarter of the low output period at the end of each cycle of counter 112, e.g. interval 370. It will also be assumed as before that N=4. FIGS. 3B and 3C illustrate the operation of counters 310 and 330 respectively, while FIG. 3D illustrates the examination of residual values from DOWN-counter 330.

The figure commences at a point where the counter 310 has a reference value pertaining to a vehicle present at the loop installation 10. In the processing interval 370, the unit 120 presets the counter 330 to load this reference value. At the start of the next cycle, i.e. a time such as $t_o$ or $t_1$ in FIG. 2, the counter 330 is clocked down for the same sample period of (M−1) loop oscillator cycles as applies for circuit 200. The next loop oscillator cycle is a processing interval 371 in which the residue, which is −1 in this case due to some ambient drift in the non-detect direction during vehicle presence, is examined by activation of the presence logic unit 350 by the unit 120 at time $t_d$. No output results. At the end of the next cycle of counter 112 the counter 330 is loaded with the same reference value from counter 310 and counted down over the sample period. The residue this time is −2. This is examined by the unit 350 at the time $t_d$ in processing interval 372 and the output 354 is activated to cause counter 310 to be incremented by 2 at time $t_3$. This increment is also applied in counter 210 as indicated at time $t_3$ in FIG. 2. Thus the predetect reference value in counter 210 is tracked to accommodate subsequent ambient change.

After correction the next operation of the DOWN-counter produces a residue of zero.

During the next cycle of counter 112 the existing DETECT signal given by detection logic unit 250, which is operating at four times the rate of the presence tracking circuit 300, is cancelled as the vehicle leaves the loop installation. Thus at interval 373 the counter 330 is loaded with the previous vehicle present detection value but then counts down over a longer period corresponding to a vehicle departure to leave a residue more negative than −2. This negative value activates output 356 to enable the counter 310 to be up-dated. Consequently at the processing interval 374 terminating the end of the cycle of counter 112, the counter 310 is re-set at time $t_e$ before which at time $t_d$ the counter 330 is loaded with the existing reference value. The sample period for counter 330 continues longer due to the vehicle departure and consequently the residue again goes heavily negative beyond the −2 threshold so that the presence logic unit activates output 356. During the same sample period the re-set counter 310 increments to a new reference value 375 corresponding to the vehicle departure so that at the next operation, generally indicated as 376, the DOWN-counter 330 is loaded with the new reference value and counts down to zero and restores the inhibit level at output 356. Simultaneously the counter 310 is again activated to increment reference value 375 again.

The foregoing assumes the vehicle departure is rapid enough to take just two cycles of counter 112 to establish a new equilibrium. It may take more but eventually the equilibrium condition will be established for no vehicle present.

FIG. 3 continues to show at 377 and 378 a drift in the detect direction, i.e. positive residue, leading to a correction of the reference value in counter 310 downward by −2 at time $t_4$. In these circumstances the presence detection counter 210 is being independently up-dated in circuit 200 at every cycle of counter 112 so that the up-dating takes precedence over the correction in the presence tracking loop. This can be done by ensuring that in the relevant processing intervals the incrementing/decrementing signal on input 222/223 occurs after the time $t_b$ when the counter 230 is loaded but before the reset of counter 210 at time $t_a$. In the meanwhile counter 310 which is inhibited from establishing a fresh reference value is corrected to track counter 210 within the correction limits of circuit 300.

The right hand side of FIG. 3 following the broken line portion illustrates the arrival of another vehicle at the loop detector installation 10, first by giving a large positive residue as the sampling period shortens to enable the lower vehicle presence reference value to be established in counter 310, the circuit then settling to this value in a manner corresponding to the described vehicle departure.

The vehicle detection installation that has been described compensates ambient change in both senses, that is the "detect" and "non-detect" directions. In some circumstances, environmental drift in the "non-detect" direction, which may eventually lead to a false vehicle departure indication may not be of concern but there is concern that a continual vehicle presence should not be falsely indicated. To this end only drift in the "detect" direction need be compensated and the presence logic unit 350 designed accordingly, or in order to provide both modes provision is made to disable the actuation of the negative residue output 355 pertaining to drift in the non-detect direction.

In the tracking of the counters 210 and 310 to follow environmental drift, the correction applied (±2 pulses) in response to a residue (±2) has equalled the residue in magnitude thereby acting to reduce the tracking error to zero, that is zero difference between the reference value in counter 310 and the sample values counted down in counter 330. This zero error tracking is not essential. Tracking may be performed with certain limited error quantity, e.g. ±1 in the described embodiment, with a correction of ±pulse being made to counters 210 and 310 for each residue of ±2 detected by presence logic unit 350.

In describing the operation of circuits 200 and 300 with reference to FIGS. 2 and 3, for simplicity of illustration the figures have shown the cycle periods of counters 110 and 112 as being essentially constant and the rates of incrementing or decrementing of the counters 210, 230, 310 and 330 as variable. It will be appreciated these rates are all equal, that is, they have the same slope. The slope is strictly a fine staircase. If the periods of counters 110 and 112 were controlled by the clock 20 to be constant and the circuits 200 and 300 counted loop oscillator cycles then there would truly be a variable slope to the incrementing or decrementing of the reference and sample counters.

In the apparatus that has been described the presence tracking performed by the circuit 300 may continue indefinitely. In some installations using detector loops of sufficient size, it may be desired to detect the arrival of a second vehicle while the first is still present after a predetermined period of time determined, for example, by gating the pulses of clock source 20 into a further counter upon the DETECT signal being given. When the further counter reaches the count value corresponding to the desired period, this can be signalled to the sequence control logic unit 120 which resets the circuits 200 and 300 to quiescent vehicle detection condition ignoring the vehicle still present, though of course the new sample count values will reflect the vehicle presence as part of the quiescent condition.

The correction of the value in counter 310 while no vehicle is present is not directly relevant to the presence detection performed in circuit 200. However, in the illustrated system, the circuit 300 through its logic unit 350 makes its own decisions as to the arrival and departure of the vehicle. The vehicle arrival decision could be derived from circuit 200. What is important is that the counter 310 achieves a value representing the presence of the vehicle once arrival is complete. Thus counter 210 might be said to remember the loop condition before arrival while counter 310 remembers it after arrival is complete, the circuit 300 then serving to track both count values in accord with ambient change.

The circuit described has a loop installation input which is of increasing frequency with vehicle arrival. In some circumstances, it may be desired to have a system in which a decreasing frequency represents vehicle arrival (the details of such a system are not relevant to an understanding of the present invention). In that case the changes of count values are of the opposite polarity and the detection logic and presence logic units are designed accordingly.

As previously mentioned, the count values may be directly representative of loop oscillator frequency. Thus the inputs from the loop oscillator installation and the master clock may be interchanged, again with a reversal of the polarity of changes in the count values. Where, as has been described, the clock frequency is much in excess of that of the loop oscillator, the resolution of the system would be reduced, assuming the factors M and N are adjusted to give the same cycle up-dating time; or a much longer up-dating cycle period is required for the same resolution. The residue thresholds set in the logic units will depend on the resolution of the system expressed in terms of acceptable ambient drift in an up-dating cycle.

The teachings of the present invention are particularly useful in vehicle detection installations which are subject to considerable ambient change. The invention may also have application in other object sensing systems where ambient changes can cause problems. The invention can be practised with vehicle or other object detection installations which use a sensing element other than an inductive loop whose sensed detection parameter can be realised as a sample count value.

The embodiment described has shown the use of separate counting operations, with separate counters, to establish or differentiate the reference and sample values in vehicle arrival and departure detection. It will be comprehended by those skilled in the art that a single train of sample values could be established, the reference value being established by taking 1 in n of the sample values for the reference.

The circuitry herein described is digital and the clock-controlled counting and logic circuitry is well-adapted to being realised in microprocessor form.

What is claimed is:

1. A method of detecting the arrival of an object in the vicinity of a sensing element sensitive to such object and subject to ambient change, comprising:

sampling the state of the element at successive occasions to obtain sample values dependent on the state of the element;

establishing at a first rate a first succession of sample values each being superseded by the next as a reference value;

establishing at a second rate greater than the first rate a second succesion of sample values and comparing each of these sample values with the existing reference value, and indicating the presence of an object in the vicinity of the loop upon the difference between the existing reference value and a sample value of the second succession compared therewith exceeding a selected threshold.

2. A method as claimed in claim 1 in which the second rate is an integral number of times the first rate and the sampling to establish a fresh reference value is effected on the same occasion as the sampling to obtain the last sample value of the second succession that is compared with the existing reference value.

3. A method as claimed in claim 1 in which sampling of the state of the sensing element is effected by monitoring a parameter of, or associated with, the sensing element and converting the monitored parameter to a digital value with the aid of a digital counting arrangement; and wherein the first succession of sample values establishing the reference value is realised by activating a first digital counter at said first rate, and the second succession of sample values is realised by activating a second digital counter at said second rate.

4. A method as claimed in claim 3 in which said second digital counter is a DOWN-counter and prior to each activation thereof to establish a sample value it is loaded with the existing reference value established in the first counter, whereby the residual value in the second counter after such activation is the difference between the sample value established therein and the reference value.

5. A method as claimed in claim 1 further comprising:

storing the existing reference value upon a presence indication being given;

continuing the establishing of the second succession of sample values after a presence indication is given, and comparing each of these sample values with the stored reference value; and indicating the departure of the object upon the difference between the stored reference value and a sample value compared therewith exceeding a selected threshold.

6. A method as claimed in claim 5 further comprising establishing a succession of sample values following the indicating of the presence of an object, detecting changes in these sample values due to ambient change, and adjusting the value of the stored reference value in dependence upon the detected changes to compensate for such ambient change.

7. A method as claimed in claim 5 in which sampling of the state of the sensing element is effected by monitoring a parameter of, or associated with, the sensing element and converting the monitored parameter to a digital value with the aid of a digital counting arrangement; and wherein the first succession of sample values establishing the reference value is realised by activating a first digital counter at said first rate, and the second succession of sample values is realised by activating a second digital counter at said second rate; and in which said first digital counter is an UP/DOWN counter whose further activation to establish a fresh reference value is inhibited upon the presence of an object being indicated, the existing reference value being stored therein and the adjustment of the stored reference value being effected by incrementing or decrementing the UP/DOWN counter in dependence upon the sense of the detected change.

8. A method of detecting an object with the aid of a sensing element sensitive to the presence of such object in the vicinity of the element and subject to ambient change, comprising:
sampling the state of the element at successive occasions to obtain sample values dependent on the state of the element;
comparing selected sample values to detect and indicate the arrival of an object in the vicinity of the sensing element,
storing as a first reference value a sample value reflecting the state of the sensing element preceding detection upon the detection of an object being indicated;
comparing sample values obtained after detection with the first reference value to detect and indicate the departure of the object from the vicinity of the sensing element; and
compensating for ambient change during the detected presence of an object by:
storing as a second reference value a sample value reflecting the state of the sensing element following the detection of an object being indicated;
comparing sample values obtained after detection with the second reference value to detect change due to ambient change, such change being indicated by the difference between the second reference value and the sample value compared therewith having a selected magnitude, and adjusting the first reference and second reference values in accordance with said detected changes so as to maintain a difference not exceeding preselected limits between the second reference value and the sample value compared therewith.

9. A method as claimed in claim 8 further comprising:
responding to further object induced changes at the sensing element by:
monitoring the difference between the second reference value and each sample value compared therewith to detect a difference exceeding a threshold value of a magnitude not less than that of said selected magnitude and indicative of the arrival or departure of an object;
upon detection of a difference exceeding said threshold value magnitude, establishing a third reference value reflecting the existing state of the sensing element following the departure of the object from the vicinity of the sensing element;
comparing sample values obtained during the absence of an object in the vicinity of the sensing element with said third reference value to detect changes due to ambient change, such change being indicated by the difference between the third reference value and the sample value compared therewith having said selected magnitude;
adjusting the third reference value in accordance with these detected changes to maintain a difference not exceeding preselected limits between the third reference value and the sample values compared therewith;
monitoring the difference between the third reference value and each sample value compared to detect a difference exceeding said threshold value magnitude, and
upon detection of a difference exceeding said threshold value magnitude, establishing a fresh value of said second reference value.

10. A method as claimed in claim 8 in which sampling of the state of the sensing element is effected by monitoring a parameter of, or associated with, the sensing element and converting the monitored parameter to a digital value with the aid of a digital counting arrangement including first and second UP/DOWN counters for storing said first and second reference values respectively, and first and second DOWN counters for establishing a first and second succession respectively of sample values for comparisons with the stored first and second reference values respectively, each comparison being made by loading a DOWN counter with the reference value stored in its associated UP/DOWN counter, and establishing a residual value by counting down the sample value from the reference value, and a change being detected by monitoring the residual values in the DOWN counter, and an adjustment for ambient change being made by incrementing or decrementing both UP/DOWN counters in accordance with the sense of the detected change as reflected in the residual value in the second DOWN counter.

11. A method as claimed in claim 8 in which sample values for comparison with said second reference value are established at a rate less than the rate of establishment of sample values for comparison with the first reference value.

12. A method as claimed in claim 11 in which the ratio between the said rates is an integral number.

13. Presence detector apparatus for use in an installation in which the presence of an object is detected by monitoring the state of a parameter of, or associated with, a sensing element sensitive to the presence of an object in the vicinity thereof, the apparatus including a detection circuit comprising:
first means for storing a reference value representing the state of the sensing element;
second means for storing a sample value representing the subsequent state of the element;
means responsive to the difference between the sample and reference values exceeding a threshold value to provide a signal indicative of the arrival of an object in the vicinity of the sensing element; and
means for controlling the establishing of a succession of reference values in the first means and a succession of sample values in the second means such that the succession of sample values in the second means is established at a rate greater than the succession of reference values in the first means.

14. Apparatus as claimed in claim 13 in which the ratio between the two rates is an integral number, and said control means is operable to establish a fresh reference value in the first means coincidentally with a sample value in the second means for comparison with the previous reference value.

15. Apparatus as claimed in claim 13 in which said first means comprises a first digital counter in which each reference value is established as a digital value and said second means comprises a second digital DOWN counter coupled to said first counter to receive the reference value as a pre-set value therefor, said control means being operable before establishing each sample value to cause pre-setting of said second counter and then to establish the sample value as a count down from the pre-set value, and said difference responsive means being coupled to said second counter to be responsive to the residual value in said second counter following the establishment of the sample value therein.

16. Apparatus as claimed in claim 13, in which said control means is responsive to said arrival-indicative signal to inhibit the establishment of a further reference value and hold the existing reference value in said first means whereby the difference responsive means is responsive during the presence of the object to the difference between a continuing succession of sample values established in the second means and said existing reference value to cancel said arrival-indicative signal upon departure of the object from the vicinity of the sensing element.

17. Apparatus as claimed in claim 16 further comprising a second detection circuit responsive to a succession of sample values representing the state of the sensing element while said arrival-indicative signal obtains to detect changes indicative of ambient change, said second detection circuit being coupled to said first means to adjust said existing reference value stored therein to compensate for detected ambient change.

18. Apparatus as claimed in claim 17 in which said first means comprises a first digital counter in which each reference value is established as a digital value and said second means comprises a second digital DOWN counter coupled to said first counter to receive the reference value as a pre-set value therefor, said control means being operable before establishing each sample value to cause pre-setting of said second counter and then to establish the sample value as a count down from the pre-set value, and said difference responsive means being coupled to said second counter to be responsive to the residual value in said second counter following the establishment of the sample value therein; and in which said first counter is an UP/DOWN counter and said second detection circuit is operable to control the direction of counting of said counter to cause the existing reference value therein to be incremented or decremented to compensate for ambient change.

19. Presence detector apparatus for use in an installation in which the presence of an object is detected by monitoring the state of a parameter of, or associated with, a sensing element sensitive to the presence of an object in the vicinity thereof, the apparatus including:

a first detection circuit responsive to a succession of sample values representing the state of the sensing element to detect and signal a change therein indicative of the arrival of an object in the vicinity of the sensing element, said first detection circuit including first means for storing a first reference value representing the state of the sensing element preceding such detection, and second means responsive to the stored reference value and to sample values following detection to detect and indicate the departure of the object from the vicinity of the sensing element; and a second detection circuit for compensating ambient change in at least one sense during the detected presence of an object comprising:

third means for storing a second reference value representing the state of the sensing element following detection;

fourth means for establishing a succession of sample values representing the state of the sensing element after detection; and fifth means responsive to a difference between the second reference value and the sample values established by the fourth means having a selected magnitude as indicative of ambient change in these sample values, said fifth means being coupled to said first means to adjust the first reference value by a predetermined amount in dependence upon ambient change detected by said fifth means; and said fifth means being coupled to said third means to adjust the second reference value by said predetermined amount in dependence upon ambient change detected by said fifth means so as to maintain a minimal difference between the second reference value and the sample values established by said fourth means.

20. Apparatus as claimed in claim 19 in which each of said first and third means comprises an UP/DOWN counter for establishing said first and second reference values in digital form and said fourth means comprises a DOWN counter for establishing in digital form said sample values for comparison with the second reference value, said fourth means being coupled to said third means to receive said second reference value as a pre-set value and to count down a sample value therefrom to provide a residual value, said fifth means being responsive to said residual value as the difference between the sample value and the second reference value.

* * * * *